US006578341B2

United States Patent
Hoffmann et al.

(10) Patent No.: US 6,578,341 B2
(45) Date of Patent: Jun. 17, 2003

(54) BUTT JOINT OF FRAME COMPONENTS

(76) Inventors: Thomas Hoffmann, Falkenweg 13, D-76646 Bruchsal (DE); Martin Hoffmann, Augartenstrasse 16, D-76646 Bruchsal (DE)

( * ) Notice: Subject to any disclaimer, the term of this patent is extended or adjusted under 35 U.S.C. 154(b) by 0 days.

(21) Appl. No.: 09/837,533

(22) Filed: Apr. 18, 2001

(65) Prior Publication Data

US 2001/0032434 A1 Oct. 25, 2001

(30) Foreign Application Priority Data

Apr. 19, 2000 (DE) .......................... 200 07 221

(51) Int. Cl.⁷ ................................. E04B 1/38
(52) U.S. Cl. ................. 52/655.1; 52/656.9; 52/703; 403/381
(58) Field of Search ............... 411/461, 466; 52/702, 699, 698, 158, 703, 655.1, 656.9; 403/381, 382, 403

(56) References Cited

U.S. PATENT DOCUMENTS

| 1,322,203 | A | * | 11/1919 | Schroeder | 403/294 |
|---|---|---|---|---|---|
| 2,347,049 | A | * | 4/1944 | Green | 52/584.1 |
| 3,147,484 | A | * | 9/1964 | Nelson | 1/47 |
| 4,509,651 | A | * | 4/1985 | Prindle | 211/70.6 |
| 4,572,720 | A | * | 2/1986 | Rockenfeller et al. | 411/387 |
| 4,934,765 | A | * | 6/1990 | Slifer et al. | 312/258 |
| 5,071,280 | A | * | 12/1991 | Turner | 403/232.1 |
| 5,419,649 | A | * | 5/1995 | Gilb | 403/231 |
| 5,603,580 | A | * | 2/1997 | Leek et al. | 403/232.1 |
| 5,737,884 | A | * | 4/1998 | Schrom | 52/187 |
| 6,050,033 | A | * | 4/2000 | Wrightman | 52/93.1 |

FOREIGN PATENT DOCUMENTS

| CH | 0 357 531 | 10/1961 |
|---|---|---|
| DE | 33 06 661 | 9/1984 |
| EP | 0 370 334 | 5/1990 |
| FR | 1 338 108 | 10/1962 |
| FR | 1 592 733 | 5/1970 |
| FR | 1 599 293 | 7/1970 |

* cited by examiner

*Primary Examiner*—Carl D. Friedman
*Assistant Examiner*—Brian E. Glessner
(74) *Attorney, Agent, or Firm*—Collard & Roe, P.C.

(57) ABSTRACT

The invention relates to a butt joint of wooden construction components such as frame components, joined together with contact surfaces, and in particular to a post-and-lock bolt joint. Such a joint has at least one connection element that is symmetrical with respect to a center plane and has the form of a dovetail-shaped double wedge, or other undercuts. This connection element engages grooves that are open toward the contact surfaces and are adapted to the cross sections of the connection elements extending on both sides of the center plane, and bridge the contact plane between the wooden construction components. The grooves are open toward the same side edges of the wooden construction components. The butt joint is secured by at least one long-stretching second connection element that is received in sections of the wooden construction components, bridging the contact plane, and which transversely penetrates the first connection element.

13 Claims, 2 Drawing Sheets

BUTT JOINT OF FRAME COMPONENTS

BACKGROUND OF THE INVENTION

1. Field of the Invention

The invention relates to a butt joint of wooden construction components such as solid wood frame components joined together with contact surfaces, with at least one connection element being designed symmetrical with respect to a center plane in about the form of a double dovetail-shaped wedge, or having some other undercuts. Bridging the plane of contact between the wooden construction components, the connection element engages grooves adapted to the cross sections of the connection element extending on both sides of the center plane. The grooves are open toward the same side edges of the wooden construction components. In particular, the invention relates to a post-and-lock joint, for example in conjunction with light framework constructions.

2. The Prior Art

A butt joint of the type specified above is disclosed in French Patent No. FR-A-1 338 198. This patent shows a long-stretching connection element received in receiving grooves extending from the contact surfaces of joined frame components into the components, bridging the plane of contact. This connection element is designed symmetrical with respect to a center axis falling in the plane of contact of the joined frame components. Spaced from the center axis, the connection element has thickened or hammer head-like sections, which engage correspondingly shaped widenings of the grooves, which taper toward the contact surfaces of the frame components, thereby providing for a form-locked connection of the frame components.

This known butt joint has been successfully used for the assembly of small construction components such as in the manufacture of furniture. However, it has the drawback that forces attacking in the direction of the longitudinal expanse of the connection element cannot be absorbed. Furthermore, the connection elements may become loose in the course of time depending on the weather conditions. This loosening can only conditionally be countered by increasing the press fit of the connection elements in their receiving grooves, because when the connection elements are driven into the grooves, this may easily cause the grooves of the construction component to be torn out.

SUMMARY OF THE INVENTION

It is therefore an object of the invention to provide a butt joint of construction components, in particular of frame components, which is capable of transmitting forces acting in the direction of the longitudinal expanse of a connection element without problems. In the present case, the term "connection of frame components" is understood to include post-and-lock bolt connections as well.

This object is accomplished according to the invention with a post-and-lock bolt joint, comprising at least one connection element which is designed symmetrically with respect to a center plane in about the form of a dovetail-shaped double wedge, or which has other undercuts. The connection element engages grooves which are open toward the contact surfaces and are adapted to the cross sections of the connection element extending on both sides of the center plane, bridging the plane of contact between the wooden construction components. The grooves are open toward the same side edges of the wooden construction components.

The butt joint is secured by at least one long-stretching second connection element which bridges the plane of contact between the wooden construction components and is received in sections of the construction elements and at the same time penetrates the first connection element transversely.

The first connection element provides for a form-locked connection between assembled frame components or other wooden construction components and is therefore itself fixed in its position in a form-locked manner by the second connection element penetrating the first connection element. Loosening of the first connection element and thus loosening of the butt joint is consequently excluded.

Furthermore, the butt joint as defined by the invention satisfies static requirements in that forces acting between the assembled wooden construction components in the direction of the longitudinal expanse of the connection element can be absorbed. The novel type of butt joint is therefore useful to applications that were not previously accessible to known butt joints of the type explained above, such as post-and-lock constructions such as glass-enclosed attachments in the form of winter gardens, or porches, where the wind pressure loading the framework fillings has to be transmitted from cross or secondary supports connected to the posts, the so-called lock bolts.

The second connection means penetrates the first connection element in an inclined manner relative to the plane of contact between the assembled frame components, and extends into the frame components and through the first connection element with an acute angle of preferably 45 degrees versus the plane of contact.

The second connection element may be a pin received in slanted bores which are located in sections of the frame components that are arranged adjacent to each other in the plane of contact, and which extend through the first connection element. The pin is secured in its installed position by suitable means. In particular, the pin forming the second connection element may be received with a press fit at least in one of the slanted bores extending in the frame components.

In an alternative embodiment of the invention, the second connection element may be an inclined nail driven into one of the wooden construction components, for example at an angle of 45 degrees in relation to the plane of contact. The nail, bridging the plane of contact, penetrates the first connection element and projects up into the second wooden construction component.

The use of screw nails as second connection elements has been found to be especially advantageous because such screw nails are capable of withstanding much greater pull-out forces than conventional nails with smooth shafts.

Instead of using a pin received in an inclined bore, or a driven-in inclined nail, it is possible to employ a safety screw as the second connection element. The safety screw is screwed into the assembled wooden construction components inclined in relation to the plane of contact between the assembled wooden construction components, with full penetration of the first connection element. A butt joint produced with the use of such a safety screw satisfies particularly high static requirements.

The safety screw preferably has a thread section equipped with a self-cutting thread. This thread section may be adjoined by the thread-free section of the shaft which, in the screwed-in condition of the safety screw, penetrates the first fastening element crosswise and secures it in its position in this way.

According to a preferred embodiment of the invention, there are at least two long-stretching second connection elements, which are arranged at an angle of preferably about 90° in relation to one another. This creates a butt joint that satisfies even higher static requirements. Such a butt joint can be stressed not only by forces directed perpendicular to the axis of the wood construction component, (which is preferably in the form of a secondary support or lock bolt), i.e. by transversely acting forces, but also by forces acting in the direction of the axis of the wooden construction component, and thus by tensile forces without resulting in loosening of the connection elements over the course of time. Furthermore, it is then no longer necessary to pay attention to the exact position of the components when they are installed.

It is useful in this connection if at least two of the long-stretching second connection elements are arranged so that their longitudinal axes are substantially disposed in one common plane.

Preferably, at least two of the second connection elements are arranged symmetrically in relation to a longitudinal axis of the first connection element, and/or in relation to the plane of contact and/or its normal.

By virtue of the measures described above, the acting forces can be favorably transmitted to the adjacent wooden construction component irrespective of the position in which the connected wooden construction components are installed. Cross forces, if any, i.e. forces acting perpendicular to the longitudinal expanse of the connection element, can be safely trapped in both directions.

The measures described above contribute both individually and in combination to a butt joint of construction components that is capable of transmitting forces acting in the direction of the longitudinal expanse of a connection element without any problems.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
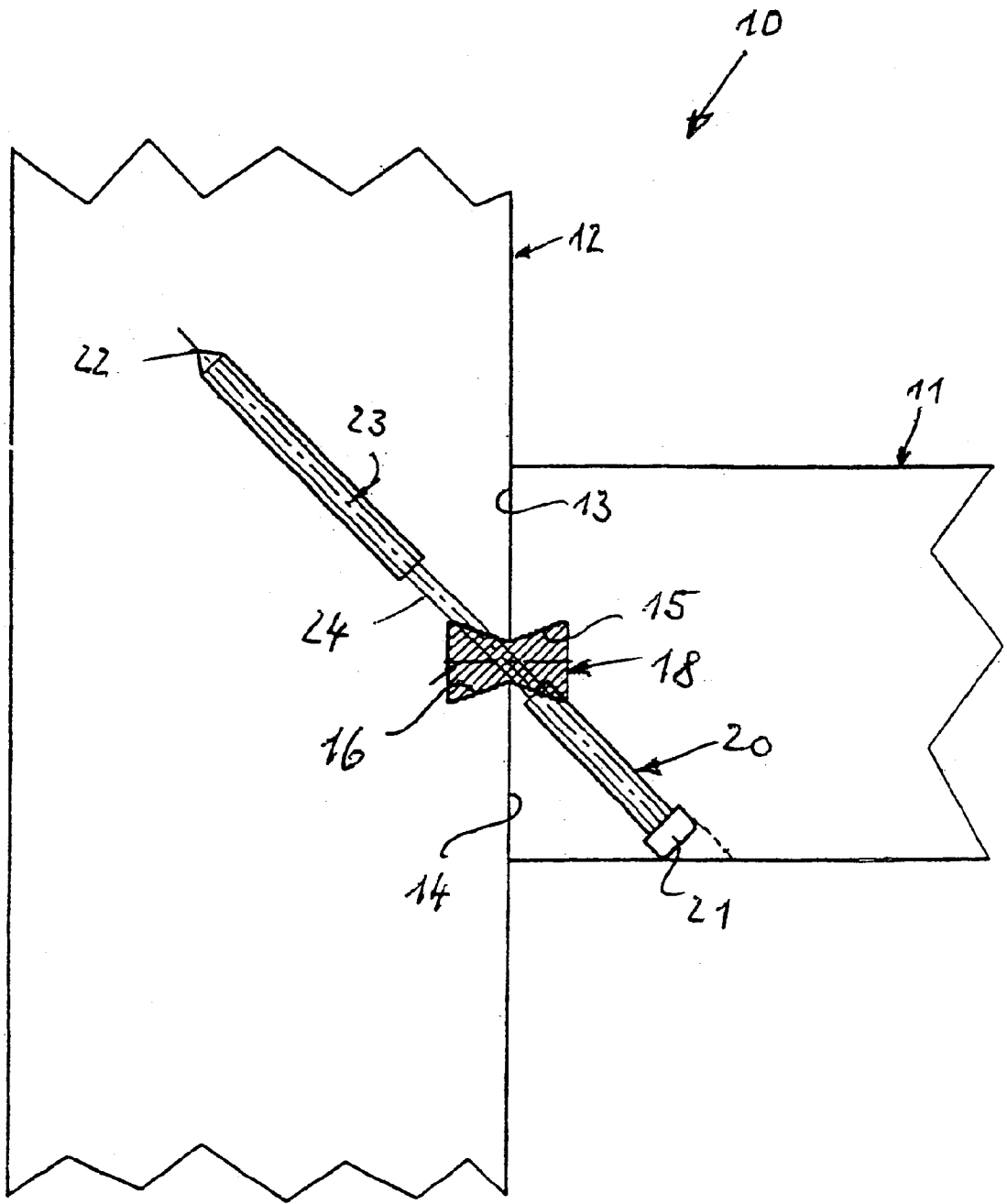
FIG. 1 shows a cross section through the butt joint as defined by the invention, with a second connection means penetrating the connection element transversely according to a first embodiment of the invention.

Referring now in detail to the drawings, the butt joint 10 shown in FIG. 1 is the connection of a horizontally extending lock bolt 11 as the secondary support with a vertically extending post 12 of the main support. Lock bolt 11 and post 12 have rectangular or square cross sections. Lock bolt 11 is attached with one face end to post 12 and thus in a butt-jointed manner. From the contact planes 13, 14 of the two construction components abutting each other in one contact plane, the receiving grooves 15, 16 corresponding with each other extend into the construction components. Receiving grooves 15, 16 extend horizontally and are in the form of a dovetail. A double wedge-shaped connection element adapted to the shape of the grooves is received in receiving grooves 15, 16, bridging the plane of contact between the lock bolt 11 and the post 12. This connection element has the form of a long-stretching element which establishes a fixed, form-locked joint between construction components 11, 12.

Receiving grooves 15, 16 may extend over the entire depth of lock bolt 11 and post 12, or may also extend from the same side edges of wooden construction components 11, 12 into the latter in the way of a blind hole. If receiving grooves 15, 16 extend all the way through, the connection elements received in the receiving grooves are visible on both sides of the post-and-lock bolt joint in the assembled condition, whereas they are visible only from one side with the blind hole design.

First connection element 18 in the form of a dovetail-shaped double wedge is secured by a second connection element in its installed position, in which it joins lock bolt 11 and post 12 with each other. The second connection element is a safety screw 20 with a shaft extending from a screw head 21. Adjoining the shaft tip 22, the shaft has a threaded section 23 with a self-cutting thread. On the side pointing at screw head 21, the threaded section 23 is adjoined by an unthreaded shaft section 24.

Starting from the underside of the lock bolt 11, the safety screw is turned into the lock bolt inclined by about 45 degrees versus the horizontal expanse of the lock bolt in such a way that the screw shaft penetrates the double wedge-shaped connection element 18 transversely and secures the connection element in its installed position as intended. This creates a butt joint of frame components or other wooden construction components that adequately satisfies the static requirements, and which permits the construction of winter gardens or porches or similar constructions in a simple and quick manner.

Lock bolt 11 and post 12 preferably are made of laminated timber boards, solid timber (coniferous wood or softwood), double or triple-beams, or laminated veneer timber. The safety screw 20 referred to as the second connection element is arranged at an angle of 15° in relation to the direction of the fibers of lock bolt 11 also serving as the secondary support, as well as in relation to post 12 also serving as the primary carrier or support.

Figure 2:
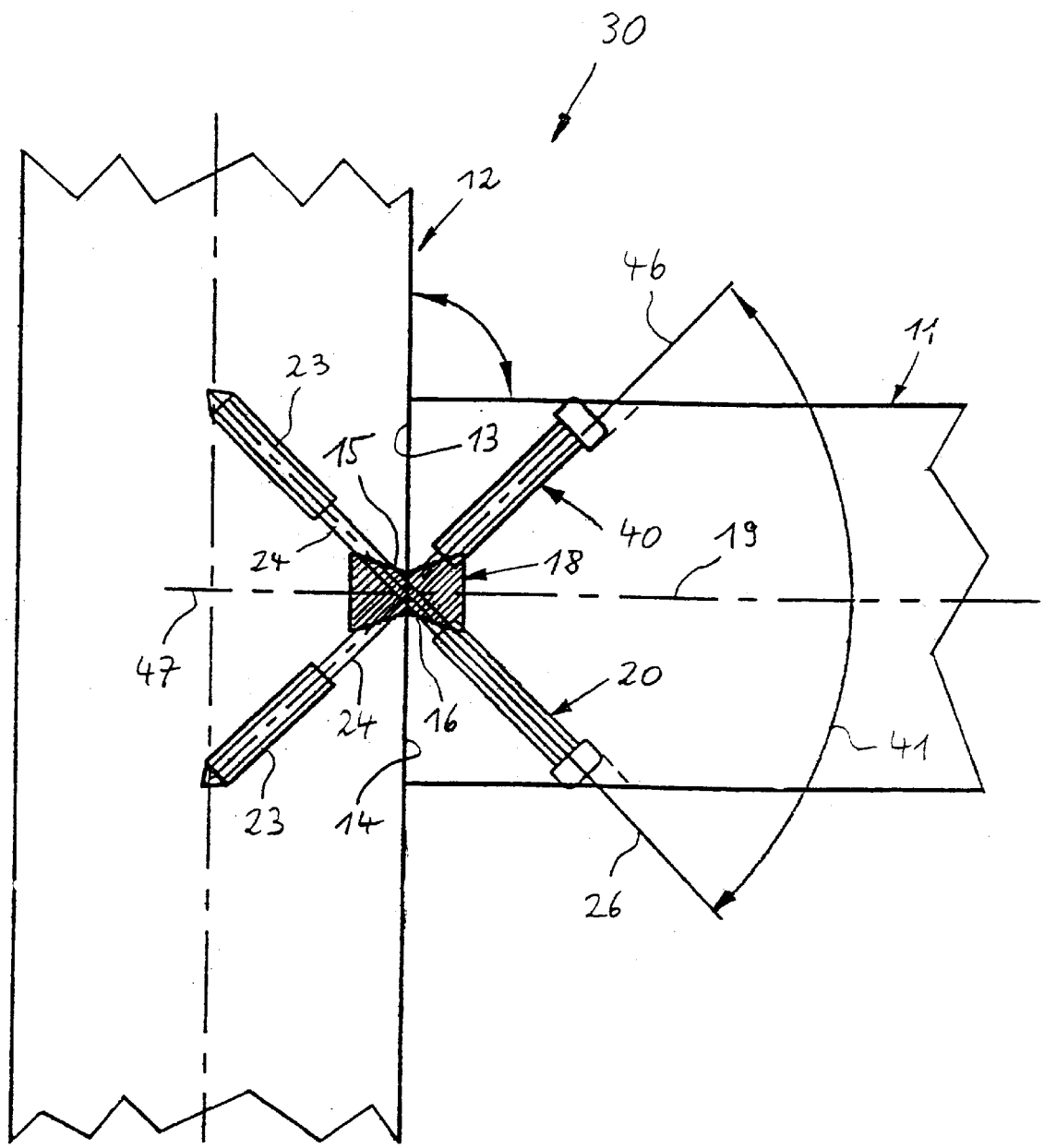
FIG. 2 shows a cross section through a butt joint with two second connection means penetrating the connection element transversely and being arranged crossed in relation to each other according to a second embodiment of the invention.

FIG. 2 shows an alternative embodiment of butt joint 30. Identical elements are denoted in this figure by the same reference numerals used in the embodiment according to FIG. 1. The horizontal lock bolt 11 designed as the secondary support and wooden construction component, and the vertical post 12 designed as the primary support and wooden construction component are joined with a double wedge or dovetail-shaped first connection element 18, which is secured by second connection elements 20, 40 in the form of safety screws. Second connection elements 20, 40 cross each other at the plane of contact and on the longitudinal axis 19 of the connection element 18 at an angle 41 of 90°.

The two second connection elements 20, 40 are arranged symmetrically in relation to the longitudinal axis 19 of first connection element 18, and symmetrically in relation to the plane of contact of the wooden construction components 11, 12, or to their normal 47. Furthermore, the two second connection elements 20, 40 are arranged so that their longitudinal axes 26, 46 are disposed in a common flat plane.

In all other respects, butt joint 30 and its connection elements are designed in the same way as butt joint 10 according to the first exemplified embodiment.

Accordingly, while only a few embodiments of the present invention have been shown and described, it is obvious that many changes and modifications may be made thereunto without departing from the spirit and scope of the invention.

What is claimed is:

1. A butt joint formed of wooden construction components joined together with contact surfaces at a plane of contact, comprising:

at least one first connection element which is designed symmetrically with respect to a center plate in about the form of a dovetail-shaped double wedge, said connection element engaging grooves in said construction components which are open toward said contact surfaces and correspond to the cross sections of the connection element extending on both sides of said center plane, said first connection element bridging the plane of contact between the construction components, and said grooves being open toward facing side edges of the construction components; and at least one long-stretching second connection element securing said butt joint, said second connection element being received between sections of the construction components and bridging the plane of contact between said construction components, and transversely penetrating the first connection element, wherein the second connection element extends across and is slanted in relation to the plane of contact between the construction components and transversely penetrates the first connection element and wherein the second connection element extends through the first connection element into the construction elements at an acute angle in relation to the plane of contact.

2. The butt joint according to claim 1, wherein the second connection element is a pin received in slanted bores extending in sections of the construction components and located adjacent to the plane of contact, said pin extending through the first connection element.

3. The butt joint according to claim 2, wherein the pin is received by press fit in at least one of the slanted bores extending in the construction components.

4. The butt joint according to claim 1, wherein the second connection element is a slanted nail.

5. The butt joint according to claim 4, wherein the slanted nail is a screw nail.

6. The butt joint according to claim 1, wherein the second connection element is a safety screw turned slanted in relation to the plane of contact between the joined wooden construction components and into said wooden construction components, with penetration of the first connection element.

7. The butt joint according to claim 6, wherein the safety screw has a threaded section provided with a self-cutting thread.

8. The butt joint according to claim 7, wherein the safety screw has an unthreaded shaft section adjoining the threaded section.

9. The butt joint according to claim 1, wherein there are at least two long-stretching second connection elements, said elements being arranged at an angle of about 90° in relation to each other.

10. The butt joint according to claim 9, wherein said at least two long-stretching second connection elements are arranged so that longitudinal axes of said second connection elements are substantially disposed in one common plane.

11. The butt joint according to claim 9, wherein said at least two second connection elements are arranged 12. The butt joint according to claim 9, wherein said at least two second connection elements are arranged symmetrically in relation to the plane of contact and to a normal of the plane of contact.

13. The butt joint according to claim 1, wherein the acute angle is about 45 degrees.

\* \* \* \* \*

UNITED STATES PATENT AND TRADEMARK OFFICE
CERTIFICATE OF CORRECTION

PATENT NO.   : 6,578,341 B2
DATED        : June 17, 2003
INVENTOR(S)  : Hoffmann et al.

It is certified that error appears in the above-identified patent and that said Letters Patent is hereby corrected as shown below:

Column 5,
Line 14, after the word "center", please change the word "plate" to -- plane --.

Signed and Sealed this

Twenty-ninth Day of June, 2004

JON W. DUDAS
*Acting Director of the United States Patent and Trademark Office*